United States Patent [19]

Meier et al.

[11] Patent Number: 5,196,838

[45] Date of Patent: Mar. 23, 1993

[54] INTELLIGENT SCROLLING

[75] Inventors: John R. Meier; John W. Sullivan, both of Cupertino; Paul Mercer, Palo Alto, all of Calif.

[73] Assignee: Apple Computer, Inc., Cupertino, Calif.

[21] Appl. No.: 635,228

[22] Filed: Dec. 28, 1990

[51] Int. Cl.⁵ ............................................... G09G 3/02
[52] U.S. Cl. .................................... 340/724; 340/721; 340/726
[58] Field of Search ............... 340/721, 723, 724, 726, 340/731, 709, 706, 710

[56] References Cited

U.S. PATENT DOCUMENTS

| | | | |
|---|---|---|---|
| 4,313,113 | 1/1982 | Thornburg | 340/709 |
| 4,698,625 | 10/1987 | McCaskill et al. | 340/709 |
| 4,720,703 | 1/1988 | Schnarel et al. | 340/724 |
| 4,831,556 | 5/1989 | Oono | 340/731 |

*Primary Examiner*—Alvin E. Oberley
*Assistant Examiner*—Chanh Nguyen
*Attorney, Agent, or Firm*—Blakely, Sokoloff, Taylor & Zafman

[57] ABSTRACT

A method and apparatus for intelligent scrolling. In a computer system that has a user interface which allows for the movement of items from a first open window to a second open window or to a second region, such as a desktop, the present invention allows a user to select one or more items in the first window, move the selected item(s) to within a predetermined distance from an edge of the first window for a predetermined period of time and cause the viewable portion of the data and-/or document within the first window to scroll in a corresponding direction.

19 Claims, 13 Drawing Sheets

| | Applications | | |
|---|---|---|---|
| Name | Size | Kind | Last Modified |
| 📁 MacFlow | -- | folder | Fri, Aug 3, 1990   2: |
| 🎨 MacPaint | 59K | application | Fri, Apr 5, 1985   4: |
| 🎨 Network DiskFit | 178K | application | Sat, Aug 22, 1987   6: |
| 🎨 QTBackup 2.03 | 504K | application | Mon, Mar 19, 1990   11 |
| 🎨 Stuffit 1.5.1 | 115K | application | Sun, Sep 4, 1988   5: |
| 📁 SuperPaint | -- | folder | Fri, Aug 3, 1990   2: |
| 🎨 UltraProgram | 999K | application | Mon, Apr 19, 1990   11 |
| 🎨 RDStuFF | 10K | application | Sun, Jan 4, 1988   5: |
| 📁 Vanilla | -- | folder | Fri, Dec 3, 1990   2: |

**FIG. 1c
Prior Art**

INTELLIGENT SCROLLING

BACKGROUND OF THE INVENTION

1. Field of the Invention

The present invention relates to the field of user interfaces for computer systems. In particular, this invention relates to an improved user interface for scrolling a visible portion of a document within a window in a computer system.

2. Description of the Related Art

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

A user interface is the means by which a user interacts with a computer system. Known user interface utilize windows and icons in conjunction with a cursor control device. The cursor control device, commonly a mouse or trackball device is used to position a cursor on a display. The mouse or trackball typically includes a switch having at least two positions for generating signals to the computer to indicate a selection or other action by a user. The combination of the windows, ICONs, and a cursor control device allows a user to operate in a visual "point and click" fashion rather then through the typing of terse computer commands. "Point and click" operation refers to positioning a cursor on a display so it is over a desired icon, setting a switch (usually a button) on the cursor control device into a second position (usually by depressing the button) and immediately resetting the switch in a first position (usually by releasing the button). The "click" generally refers to tactile and audible feedback to the user on depressing and releasing the button. An example of such a user interface is the Finder TM interface of the Macintosh ® family of Computers available from Apple ® Computer Inc. of Cupertino, California. The Finder interface as implemented allows a user to locate, manage and organize data files and applications on the Macintosh Computer System. Portions of this point and click interface, as well as a mouse, have been described in U.S. Pat. No. 4,464,652.

The Macintosh system organizes files in a hierarchical fashion. Hierarchical files systems are well known in the art and have been utilized on numerous computer systems, e.g. the UNIX ® (a registered trademark of AT&T) operating system. A directory in a hierarchical file system is comprised of items. These items include data files, executable code files, and other directories (e.g. sub-directories) that are directly accessible. The Macintosh system uses the term folder to denote a directory or sub-directory.

As utilized by the Finder interface, a window displays the contents of a folder or a storage medium (e.g. a diskette). Known computer systems, including the Macintosh Computer, allow for the concurrent display of multiple windows. A desirable feature of the Finder interface is the ability to select an item or set of items in one window and move them to another window. This feature is described with reference to FIG. 1a "© 1986 Apple Computer, Incorporated" (17 U.S.C. 401). FIG. 1a illustrates a first window 1 and a second window 2, both open on display 3. To utilize this feature, the user moves the cursor (e.g. by moving the mouse) to position it over the item to be selected and then places the switch associated with the mouse in a predetermined position (usually in the down position); this indicates to the computer system that the item has been selected (typically for some further action to be specified by the user). In FIG. 1a, the item 4 has been selected. To move the selected item, the user keeps the switch in the predetermined position and the cursor over the item and then moves the cursor to another window (e.g. window 2 in FIG. 1a). With the Finder interface, an outline of the selected item will move with the cursor to the second window 2. This is often called "dragging" the item. At this point, the user may release the switch associated with the mouse into an up position and the item 4 will appear in the second window 2. With the Finder interface, this has the effect of moving the selected item(s) from one folder (directory or sub-directory) to another folder (directory or sub-directory) or copying the item(s) from one storage medium, to another storage medium, e.g. a diskette to a fixed hard disk. If the movement of the item is characterized as a movement from one folder to a second folder, the item 4 would disappear from window 1, otherwise item 4 would remain in window 1 as well as be displayed in window 2. Additionally, the Finder interface allows items to be removed from a window and placed on the Finder desktop and further allows selected items to be copied to ICONs located on the Finder desktop, the ICONs representing folders or a storage medium. These capabilities are well known to users of the Macintosh Computer System and have been described in numerous references.

A window (also called a visible display area) utilized by the Finder interface is illustrated in FIG. 1b "© 1986 Apple Computer, Incorporated" (17 U.S.C. 401). A data display area 101 contains names and ICONs of items within that particular folder or storage medium, 102. The ICON represents the type of item, i.e. a folder, data file or executable code file. The window is further comprised of window control means, including a zoombox 103, a title bar 104, a closebox 105, a title 106, a horizontal scroll box 107, a horizontal scroll bar 121, a left scroll arrow scroll box 107, a horizontal scroll bar 121, a left scroll arrow 108, a right scroll arrow 109, a size box 110, a vertical scroll box 112, a vertical scroll bar 122, an up scroll arrow 111, and a down scroll arrow 113. Use of the window control means identified in FIG. 1 will be familiar to users of the Apple Macintosh computer.

When the data and/or document which is being displayed within the window is larger than the data display area 101 or the window, some of the data is "hidden". This "hidden" data can be brought into the data display area 101 through scrolling. Scrolling refers to moving the data/document in a user defined direction in order to bring "hidden" portions within the data display area 101. Known window interfaces provide different methods for scrolling. One method is to provide predetermined scroll areas where scrolling can be invoked; e.g. scroll bars, scroll arrows or scroll boxes. Using this method, the user positions the cursor in the scroll area and a switch associated with the cursor control device is placed in a predetermined position or clicked. Scrolling will occur in a direction and manner associated with the particular scroll area. A second method is to initiate scrolling whenever the computer system detects that a cursor is on or near the edge of the window and a switch associated with the cursor device is in a predetermined position. Scrolling will then occur in a corresponding direction of the window edge detected. A third known method, primarily used in application software, allows a user to select an icon from a function palette, to enable the cursor to control movement of the data within the window in a corresponding fashion. This action is analogous to moving a flat piece of paper around on a desk with one's hand.

The Finder interface, as shown in FIG. 1b, provides three alternative means for scrolling. It should first be noted that the position of scroll boxes 112 and 107 within the scroll bars 122 and 121 respectively, represent a relative position of the data being displayed, within the document. In a first direct means to move the data display area 101 vertically, the cursor is moved into the vertical scroll box 112 and the switch associated with the cursor control device is placed and kept in a predetermined position while the cursor control device is manipulated to cause the cursor to be moved vertically, which also causes the vertical scroll box 112 to be moved vertically within the vertical scroll bar 122, in a corresponding fashion. As long as the switch is kept in the predetermined position, the vertical position of the scroll box 112 is determined by the vertical displacement of the cursor. When the switch is taken out of the predetermined position, the vertical scroll box 112 is deposited at its current location and the data within the visible area 101 of the window shown in FIG. 1a will have scrolled according to the final position of the vertical scroll box 112 relative to the original position of the vertical scroll box 112. In this manner, some or all of the hidden data and/or document within the window will be scrolled into the data display area 101.

A second method for vertical scrolling is by positioning the cursor at a desired location within the scroll area 122 and clicking on the switch associated with the cursor control device. It should be noted that the vertical scroll area 122 may be either atop and/or below the vertical scroll box 112. By positioning the cursor either above or below the vertical scroll box 112 and clicking the switch on the cursor control device, the "next windowful" of data will be displayed. If the cursor is positioned above the vertical scroll box 112, the "next windowful" will be above the data that is currently being displayed. If the cursor is positioned below the vertical scroll box 112, the "next windowful" will be below the data that is currently being displayed. "Next windowful" refers to data adjacent to that which is currently being displayed, up to the amount allowable by the data display area 101.

A third means for vertical scrolling may be accomplished by manipulating the cursor control device to position the cursor over the directional arrows 111 or 113 and then placing the switch in a predetermined position; the data and/or document within the window will scroll in the appropriate direction (until the data and/or document has been scrolled completely to the particular vertical end) while the cursor is kept over the appropriate arrow 108 or 109 and the switch is kept in the predetermined position. This is often called scrolling by line.

An example of the result of vertical scrolling is illustrated by comparing FIG. 1b with FIG. 1c "© 1986 Apple Computer, Incorporated" (17 U.S.C. 401). To reveal more items which are hidden in the view shown in FIG. 1b, either the vertical scroll box 112 is moved downward or the cursor is placed over the down scroll arrow 113 and the switch is placed in the predetermined position. The results of such scrolling is illustrated in FIG. 1b. Referring to FIG. 1b, items 114, 115, and 116 represent the three topmost items listed. After a vertical scroll, the display is as illustrated in FIG. 1c. The items 114, 115, and 116 have been scrolled off of the screen. Item 117, which was the fourth listed item in FIG. 1b, is now the first item in FIG. 1c. Additionally, more items, i.e. items 118, 119, and 120 are now visible in the display, Further, the vertical scroll box 112 has been vertically displaced to reflect a vertical scrolling and a relative position of the items displayed.

Horizontal scrolling is accomplished in a similar fashion with the horizontal scroll box 107, the horizontal scroll area 121 or the horizontal scroll arrows 108 and 109. In the Finder interface, horizontal scrolling is disabled when the items are being viewed by "by Name". Viewing by name refers to a disk display of the items with certain characteristic information included (e.g. size, kind, and last modified). Alternatively, the items may be viewed as ICONs. When viewed as ICONs, horizontal scrolling is enabled.

As noted aboved, it is a desirable feature of the Finder interface to be able to select and move or copy items to and from open windows. For known window interfaces, this feature is mutually exclusive with the scrolling method where the cursor is detected in a predetermined area (e.g. the scroll bars or the scroll arrows) and the switch associated with the cursor control device is in a predetermined position. The reason for this is to avoid undesired results. For example, unintended scrolling may occur if selected items are being "dragged" from one window to another. This occurs because the switch associated with the cursor control device will be in the position to invoke scrolling and in order to position the cursor to another window, a window edge and a scroll area will usually be entered and detection in the scroll area will cause scrolling to occur.

In the instance where selected item(s) are being moved to a folder that is "hidden" in the window, prior methods of accomplishing this task are cumbersome and unproductive. Such methods include selecting the items, "dragging" and depositing the item(s) on the Finder desktop, scrolling to the desired folder, re-selecting the item(s) from the Finder desktop and "dragging" the items for deposit into the desired folder. A second method would be to open the desired folder as a second window, scrolling and selecting the desired item(s), "dragging" the selected item(s) across the windows depositing the item(s) in the second window, and closing the window representing the desired folder. In each of these methods the desired items are selected and dragged, but require additional operations to accomplish the task. Moreover, each of these methods is premised on the feature that an item may be "dragged" and deposited outside of the window in which it was selected. Thus, it is desirable to provide for scrolling in a window when item(s) have been selected and are being "dragged" to a folder within the same window.

It is an object of the invention to provide an improved method and apparatus for scrolling; where it is possible to select an item(s) within a window, drag the item(s) and invoke scrolling of data within the window when the cursor is detected in a predetermined area of the window for a predetermined period of time.

SUMMARY OF THE INVENTION

A method and apparatus for a computer controlled display system which provides for context sensitive scrolling is disclosed. In a computer system that has a user interface which allows for the movement of items from a first open window to a second open window or to a second region, such as a desktop, the present invention allows a user to select one or more items in the first window, move the selected item(s) to within a predetermined distance from an edge of the first window for a predetermined period of time and cause the viewable portion of the data and/or document within the first window to scroll in a corresponding direction.

The present invention detects that one or more items in a region, such as a window have been selected, and that a switch associated with a cursor control device is in a second (usually down) position. Upon movement of the cursor, the selected item(s) are "dragged" or moved to another portion of the window or potentially to a second open window. The present invention then detects if a cursor on the display has been in a predetermined scroll area for a predetermined period of time when items are being "dragged". If the predetermined area that is detected is near the top edge of the window, the viewable portion will scroll down (i.e. the data and/or document within the window will scroll down so that the hidden data above the previously visible data will become viewable). If the predetermined area detected is near the bottom edge of the window, the viewable portion will scroll up (i.e. the data and/or document within the window will scroll up so that the hidden data below the previously visible data will become visible). Similarly, if the predetermined area that is detected is near the left edge of the window the viewable portion will scroll to the right (i.e. the data and/or document within the window will scroll to the right so that the hidden data to the left of the previously visible data will become visible), and if the predetermined area that is detected is near the right edge of the window, the viewable portion will scroll to the left (i.e. the data and/or document within the window will scroll to the left so that the hidden data to the right of the previously visible data will become visible).

BRIEF DESCRIPTION OF THE DRAWINGS

FIG. 1c illustrates a prior art screen display as illustrated in FIG. 1 after scrolling has been invoked.

DESCRIPTION OF THE PREFERRED EMBODIMENT

A method for display of information in a computer system is described. In the following description, numerous specific details are set forth such as pixel widths and wait times, in order to provide a thorough understanding of the present invention. It will be obvious, however, to one skilled in the art that the present invention may be practiced without these specific details. In other instances, well-known control structures and coding techniques have not been shown in detail in order not to unnecessarily obscure the present invention.

OVERVIEW OF THE COMPUTER SYSTEM OF THE PREFERRED EMBODIMENT

Figure 2:
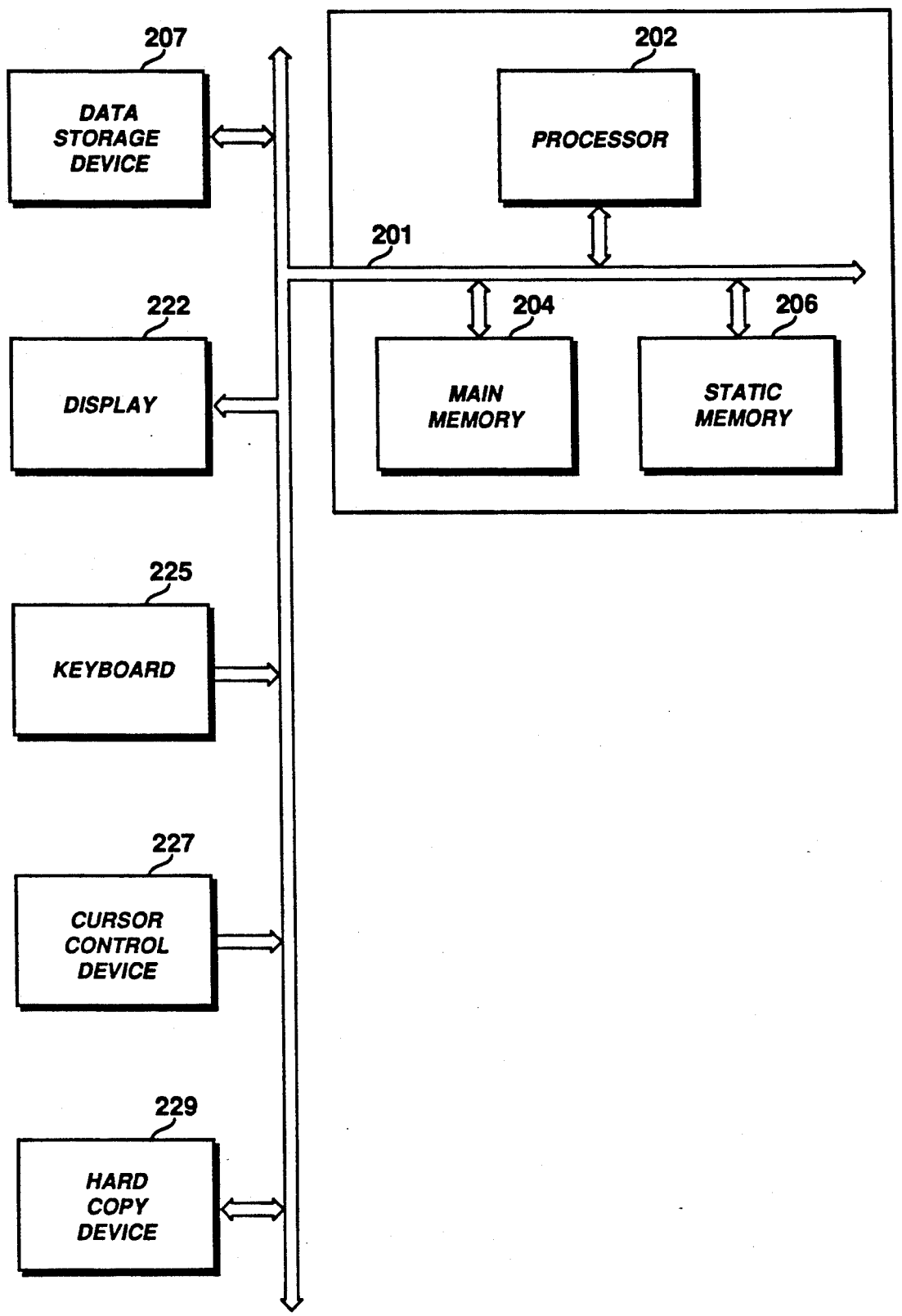
FIG. 2 illustrates a computer system as may be utilized by the present invention.

The computer system of the preferred embodiment is described with reference to FIG. 2. The present invention may be implemented on a general purpose microcomputer, such as one of the members of the Apple® Macintosh® family, one of the members of the IBM Personal Computer family, or one of several work-station or graphics computer devices which are presently commercially available. Of course, the present invention may also be implemented on a multi-user system while encountering all of the cost, speed and function advantages and disadvantages available with these machines. It is advantageous in the selection of any computer for implementation of the present invention that the computer is capable of supporting relatively high resolution graphics devices.

In any event, a computer system as may be utilized by the preferred embodiment generally comprises a bus or other communication means 201 for communicating information, a processing means 202 coupled with said bus 201 for processing information, a random access memory (RAM) or other storage device 204 (commonly referred to as a main memory) coupled with said bus 201 for storing information and instructions for said processor 202, a read only memory (ROM) or other static storage device 206 coupled with said bus 201 for storing static information and instructions for said processor 202, a data storage device 207, such as a magnetic disk and disk drive, coupled with said bus 201 for storing information and instructions, a display device 222, such as a cathode ray tube, liquid crystal display, etc, coupled to said bus 201 for displaying information to the computer user, an alphanumeric input device 225 including alphanumeric and other keys coupled to said bus 201 for communicating information and command selections to said processor 202, and a cursor control device 227, such as a mouse, track-ball, cursor control keys, etc, coupled to said bus 201 for communicating information and command selections to said processor 202 and for controlling cursor movement. It should be noted that the cursor control device of the preferred embodiment will be coupled with at least one switch capable of being detected in at least two positions. Finally, it is useful if the system includes a hardcopy device 229, such as a printer, for providing permanent copies of information. The hardcopy device 229 is coupled with the processor 202, main memory 204, static memory 206 and mass storage device 207 through bus 201.

The preferred embodiment of the present invention is implemented in the Finder Interface on a Macintosh computer available from Apple Computer, Inc. of Cupertino, Calif.

DESCRIPTION OF A WINDOW IN THE PREFERRED EMBODIMENT

Windowing systems provide the capability of displaying data in user-definable regions, which are usually rectangular portions of a display screen. Controls are typically provided to re-size and move windows within the confines of the physical display boundaries. Additional controls provide for scrolling data and/or a document through a data display area associated with the window. It is a feature of window systems to provide for multiple viewable windows within the confines of the physical display boundaries. The window system of the preferred embodiment further provides a feature whereby selected items from a first window may be moved to a second window.

Figure 3:
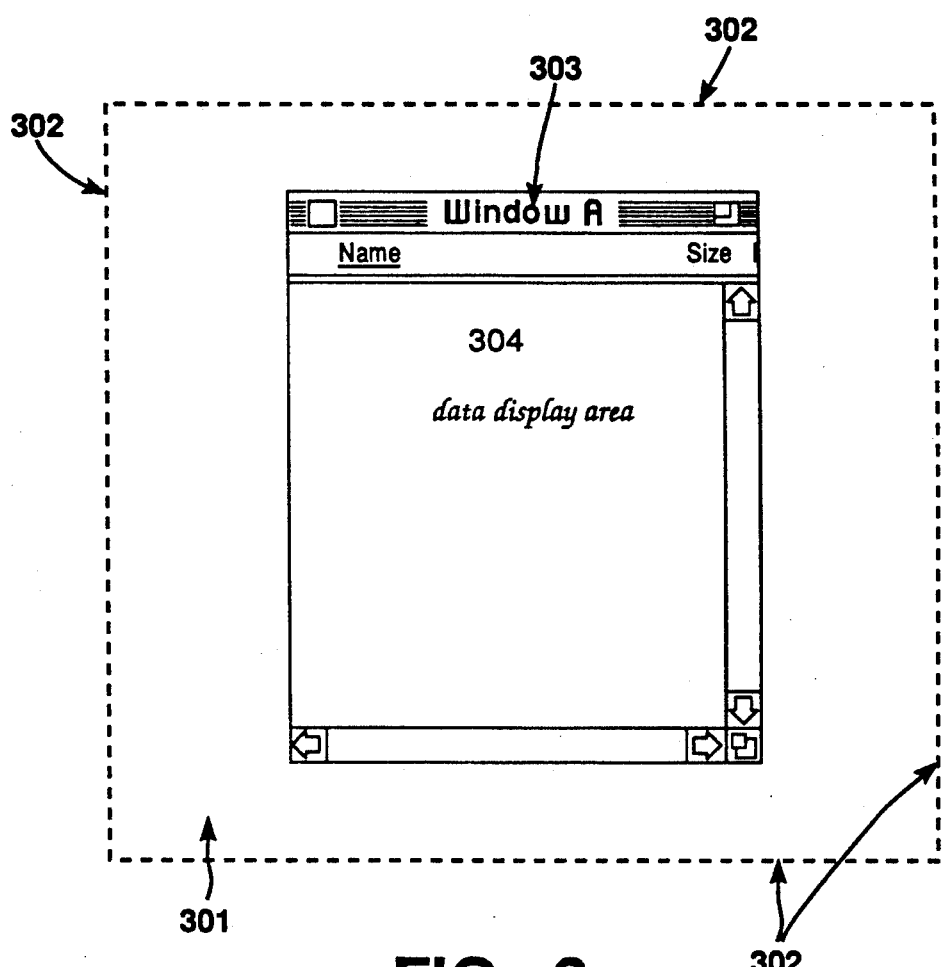
FIG. 3 illustrates a document's viewable display area and corresponding window (visible display area) as may be utilized by the present invention.

A window as may be utilized by the preferred embodiment is illustrated in FIG. 3 "©1986 Apple Computer, Incorporated" (17 U.S.C. 401). A viewable display area 301 is represented by the rectangular area within the dashed lines 302. The viewable display area 301 represents, in concept, the area on which data is contained for a particular window or the entirety of a document. A window or visible display area 303 is also illustrated. The terms window and visible display area are used interchangeably to describe what a user would see of the data or document and window control means, on a display screen. The visible display area 303 is comprised of a data display area 304 and a plurality of window control areas (described in more detail below). The data display area 304 contains the currently visible data. In the preferred embodiment, visible data consists of the contents of a folder or the contents of a storage medium but alternatively may be a graphics document or other type of document. The contents in the preferred embodiment are singularly called items and include data files, executable code files, and other folders. It should be noted that if visible data does not exist, the corresponding folder or storage medium is empty.

The window control areas provide a means by which a window can be closed, re-sized or means by which the viewable display area 301 can be moved through the data display area 304 (i.e. scrolling). It is obvious that, in many instances, the viewable display area 301 can be wholly contained within the data display area 304. This often occurs when the viewable display area 301 is small or if the visible display area 303 is large enough to cover all viewable data and/or the entire document.

Figure 1A:
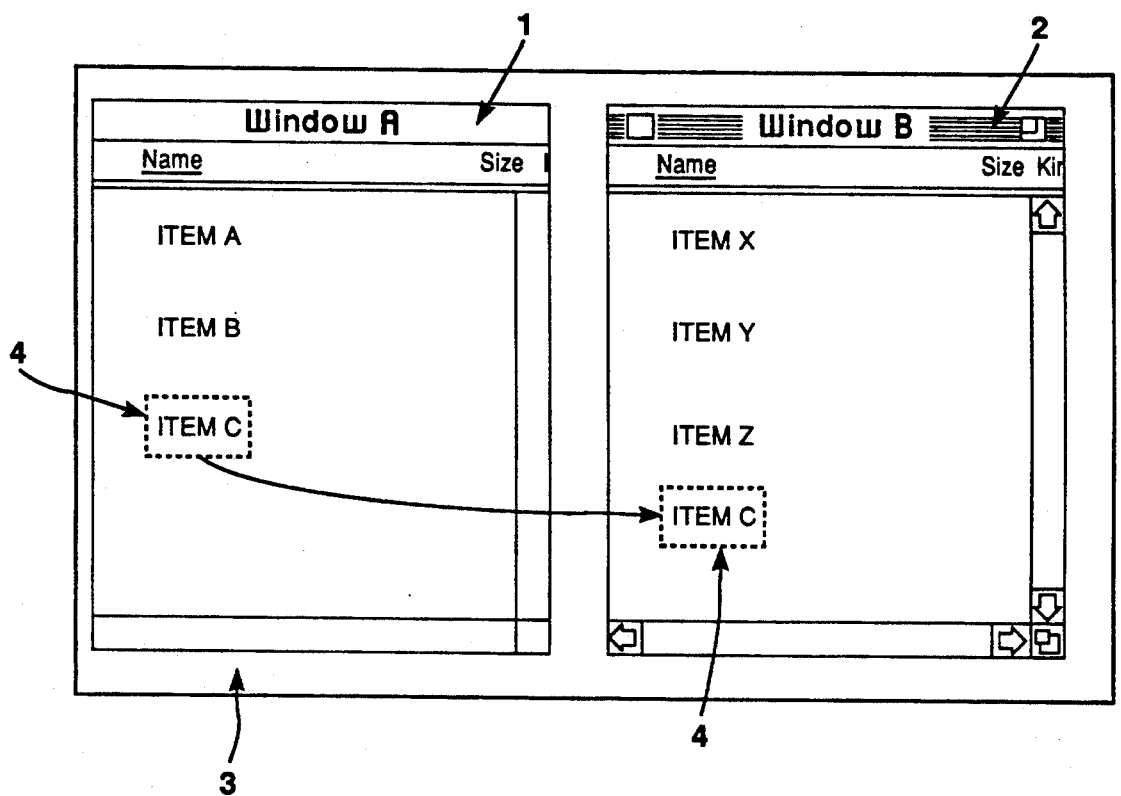
FIG. 1a illustrates a screen display, displaying two windows.
Figure 1B:
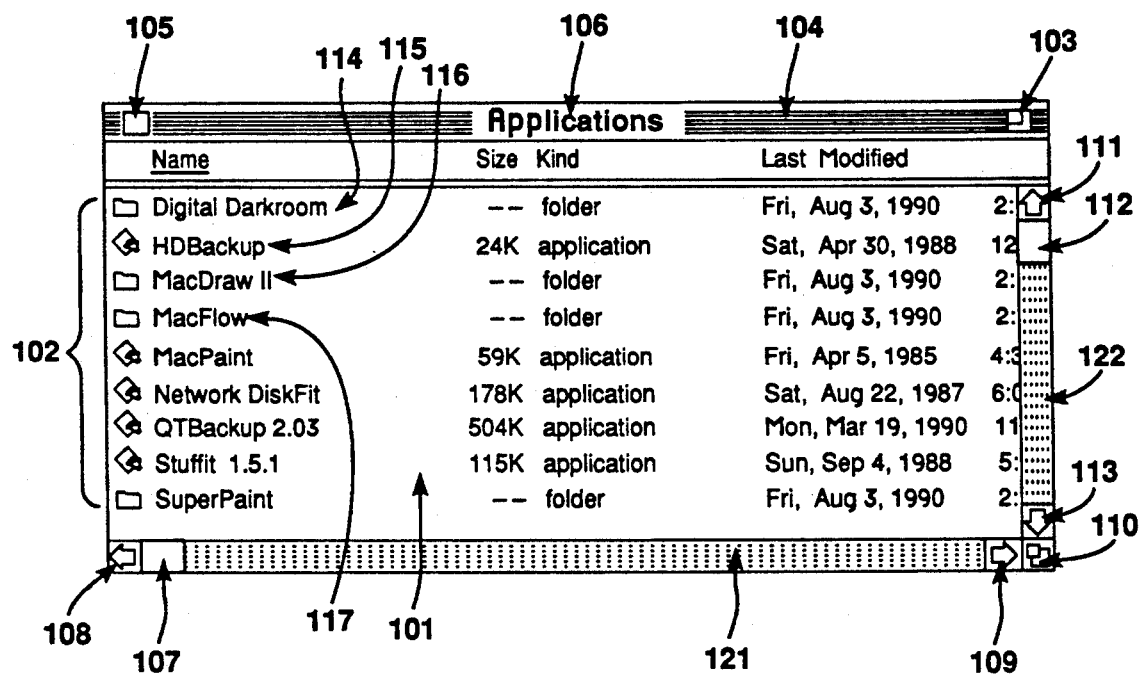
FIG. 1b illustrates a prior art screen display as utilized by the Finder Interface.
Figure 4:
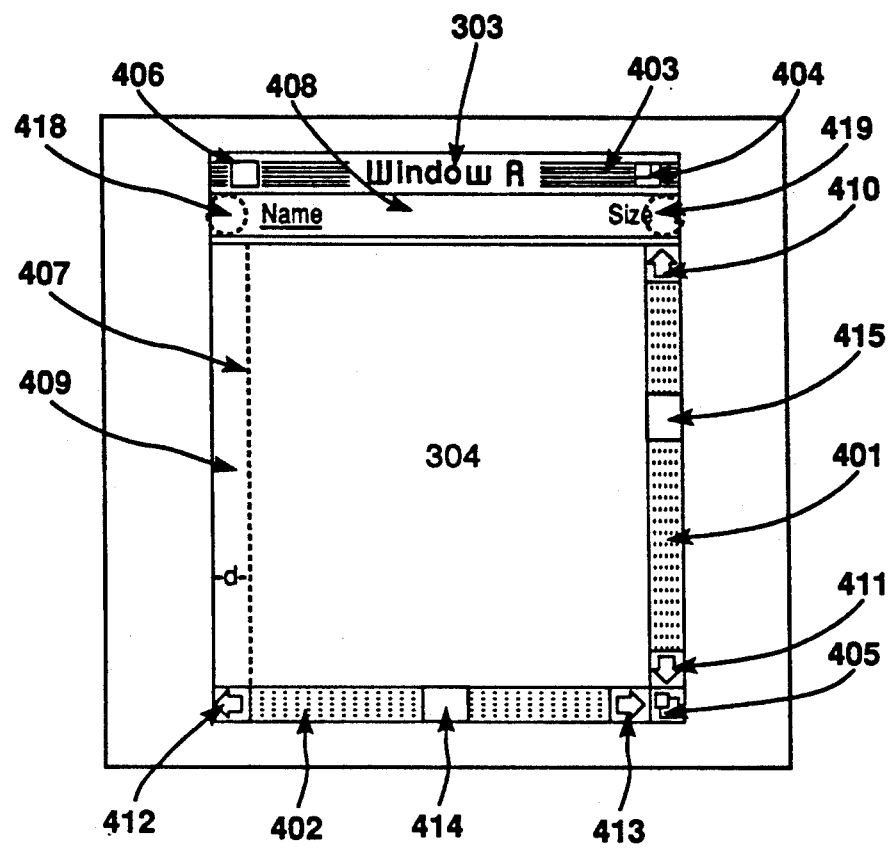
FIG. 4 illustrates in detail a visible display area as may be utilized by the present invention.

Referring now to FIG. 4 "©1986 Apple Computer, Incorporated" (17 U.S.C. 401), a visible display area 303 is shown in more detail. As described above, the visible display area 303 is comprised of a data display area 304 and a plurality of window control areas. In the preferred embodiment, these areas include a horizontal scroll bar area 402, a horizontal scroll box 414, a left scroll arrow 412, a right scroll arrow 413, a vertical scroll bar area 401, vertical scroll box 415, an up scroll arrow 410, a down scroll arrow 411, a window drag area 403 (to move the entire window), a window zoom area 404, a window re-size area 405, a close window area 406, and a header area 408. Also illustrated in FIG. 4 but not visible to the user in the preferred embodiment is a line 407. The line 407 represents a distance "d", measured in pixels, from the left edge of the window, which would invoke the scrolling of the preferred embodiment when the computer system detects a particular sequence of events is occurring. It should be noted that the screen display of the present invention is substantially similar to that in FIG. 1b.

Orienting from the viewer's perspective, in the preferred embodiment, the distance "d" extends 20 pixels from the left edge of the window or visible display area 303. Use of an alternative distance "d" would not depart from the spirit and scope of the present invention. Additionally, in the preferred embodiment, the distance "d" remains constant, independent of the size of the visible display area 303. It would be obvious to one skilled in the art to vary the size of the distance "d" to be associated with the size of the visible display area 303. In any event, the distance "d" extends from the left edge of the visible display area 303 creating scroll area 409.

In the preferred embodiment left to right scrolling is invoked in scroll area 409 when item(s) are selected and being dragged. Selection of items and dragging of selected items are discussed in greater detail below. Left to right scrolling refers to a change in the viewed data where data located towards the right of the visible display area is removed from the visible display area, data located towards the left is moved to the right, and new data is displayed from the left side of the display area. The scroll area 409 has no visible display boundaries and is defined within the data display area 304. It would be obvious to one skilled in the art to define scroll area 409 so that it is not part of the data display area 304 but as a predefined scroll area.

On the bottom edge of the window 303, horizontal scrolling means are defined, i.e. horizontal scroll bar area 402, horizontal scroll box 414, left scroll arrow 412 and right scroll arrow 413. Further defined is the window re-size area 405. In the preferred embodiment, bottom to top(vertical) scrolling can be invoked when the cursor is in one of the areas 402, 405, 412, 413 or 414, when item(s) are selected and are being dragged. Bottom to top scrolling refers to a change in the viewed data where data located towards the top of the visible display area is removed from the visible display area, data located towards the bottom is moved up, and new data is displayed from the bottom of the display area. This differs from the prior art in that the aforementioned areas 402, 412, 413 and 414 not only provides for horizontal scrolling when an item is selected and not being dragged but also provides for vertical scrolling when an item is selected and is being dragged.

On the right edge of the window 303, the vertical scroll bar area 401, vertical scroll box 415, up scroll arrow 410, down scroll arrow 411 are defined. In the preferred embodiment, right to left (horizontal) scrolling can be invoked when the cursor is positioned in one of the areas 401, 410, 411 or 415 when item(s) are selected and are being dragged. Right to left scrolling refers to a change in the viewed data where data located towards the left of the visible display area is removed from the visible display area, data located towards the right is moved to the left, and new data is displayed from the right side of the display area. This differs from the prior art in that the aforementioned areas 401, 410, 411 and 415 not only provide for vertical scrolling when an item is selected and not being dragged but also provides for horizontal scrolling when an item is selected and is being dragged.

The header area 408 is defined adjacent to and below the drag area 403. The header area 408 provides information concerning the data being displayed. In the preferred embodiment top to bottom scrolling is invoked in header area 408 when item(s) are selected and being dragged. Top to bottom scrolling refers to a change in the viewed data where data located towards the bottom of the visible display area is removed from the visible display area, data located towards the top is moved down, and new data is displayed from the top of the display area.

It would be obvious to one skilled in the art to create the scroll areas of the preferred embodiment so that they did not exactly match those as described above for areas 401, 402, 405, 408, 410, 411, 412, 413, 414 and 415. Further, the scrolling of the preferred embodiment is on a line by line basis for vertical scrolling, and on a column by column basis for horizontal scrolling. It would be obvious to one skilled in the art to scroll by other means, e.g. by the windowful. Such deviations would not depart from the spirit and scope of the present invention.

It should be noted that the corner intersections of each of the scroll areas may define scrolling in a diagonal direction when an item is selected and being dragged. The corner 418 will invoke scrolling in a top to bottom and left to right direction. The corner 419 will invoke scrolling in a top to bottom and right to left direction. The corner 405 (also the window re-size area) will invoke scrolling in a bottom to top and right to left direction. Finally, the corner 412 (also the left scroll arrow) will invoke scrolling in a bottom to top and left to right direction.

It is also notable that the corners 405 and 412 perform alternative functions depending on the task being performed. This differs from the prior art where the corners 405 and 412 provided not function when item(s) were selected and being dragged.

The scroll directions corresponding to each of the scroll areas in the preferred embodiment represent movement of the data in a direction that is intuitively natural to the user. For example, when the user wishes to view data below the currently displayed data, it is natural to look downwards. Thus, movement of the cursor towards the bottom of the window, to invoke bottom to top scrolling is intuitively correct.

SCROLLING IN THE PREFERRED EMBODIMENT

Figure 5A:
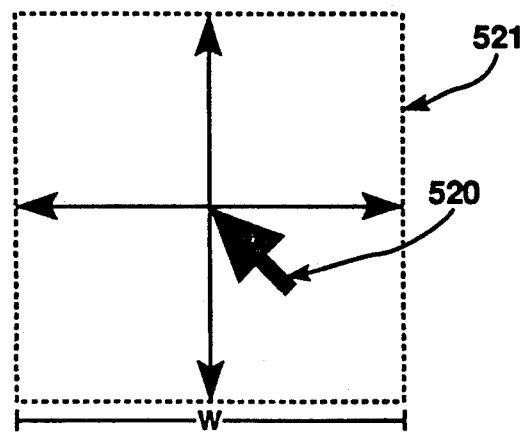
FIG. 5a illustrates a rectangular box outlining a cursor as may be utilized by the present invention.
Figure 5B:
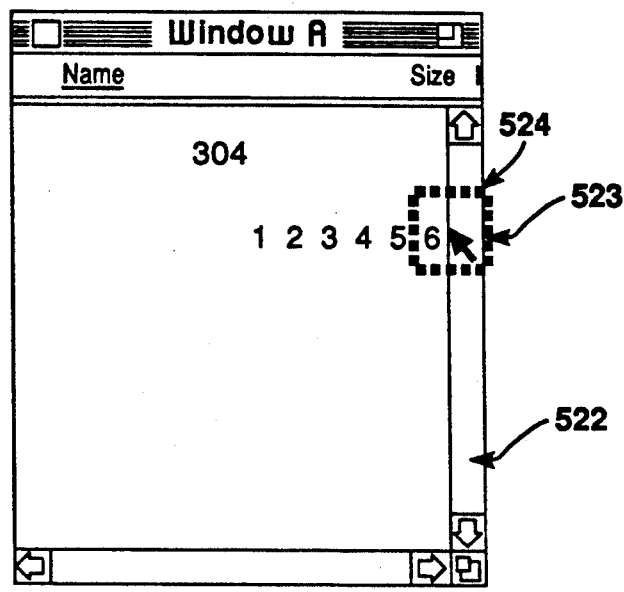
FIG. 5b illustrates the before scrolling contents of the rectangular box as may be utilized by the present invention.
Figure 5C:
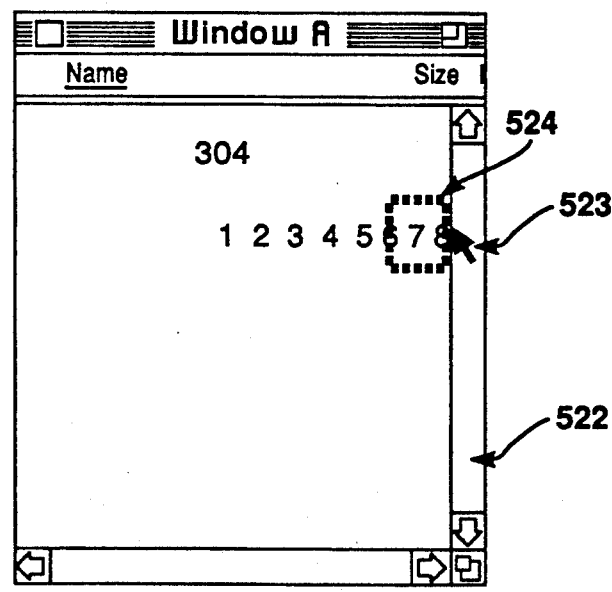
FIG. 5c illustrates the after scrolling contents of the rectangular box as may be utilized by the present invention.

The scheme by which scrolling occurs in the preferred embodiment is explained with reference to FIGS. 5a–5c "©1986 Apple Computer, Incorporated" (17 U.S.C. 401). Referring to FIG. 5a, a cursor 520 is surrounded by a rectangular area 521 (which is not visible to the user). In the preferred embodiment, the rectangular area 521 is a square whose width is 32 pixels (approximately 2 times that of a scroll bar e.g. vertical scroll bar 401). However, it would be obvious to have a rectangular area with different widths or one that was not defined as a square. When the cursor 520 is detected in one of the scroll areas so that scrolling is invoked (described in greater detail below), the data is scrolled so that the contents of the whole rectangle 521, is visible within the window. This is best illustrated by comparing FIG. 5b with FIG. 5c. In FIG. 5b a cursor 523 is in a scroll area 522 before scrolling has occurred. It should be noted that the contents of a rectangular area 524 are not completely visible within the data display area 301. Referring now to FIG. 5c, after scrolling, the contents of the rectangular area 524 are now completely visible within the data display area 304. The above described process repeats, for as long as the cursor is in the scroll area and there is data remaining to be viewed in the direction being scrolled.

The means by which the portion of the rectangular area that needs to be made visible is calculated and displayed, is known in the art. Such means are often embodied as window control macros within a user interface system. Such window control macros exist in the Finder interface. Thus, in the preferred embodiment the rectangular box information is passed to window control macros, which in turn causes the new data to be displayed, i.e. scrolled.

The scheme of the preferred embodiment has two implications. The first is that when the cursor is positioned in a corner intersection of two scroll areas, the scrolling necessary to make the rectangular area completely visible must be in a diagonal direction. Second, the position of the cursor relative to the edges of a scroll area determines the amount of data to be scrolled in order to make the rectangular area completely visible. The closer to an outside edge of the window, the more data that will need to be scrolled for an individual step. Thus, the closer to an outside edge of the scroll area, the faster the scrolling of data will appear to the user.

The manner in which scrolling is typically invoked will be described in the context of a task. The task here is the selection of one or more items in a window, scrolling the window to locate a desired destination folder and depositing the selected items in that folder. However, other tasks may utilize the present invention e.g. scrolling to select another item while keeping the originally selected item still selected, with equal benefit. It should be noted that the present invention operates in a windowing interface where a plurality of windows may be open and items may be moved from one window to another.

Figure 6:
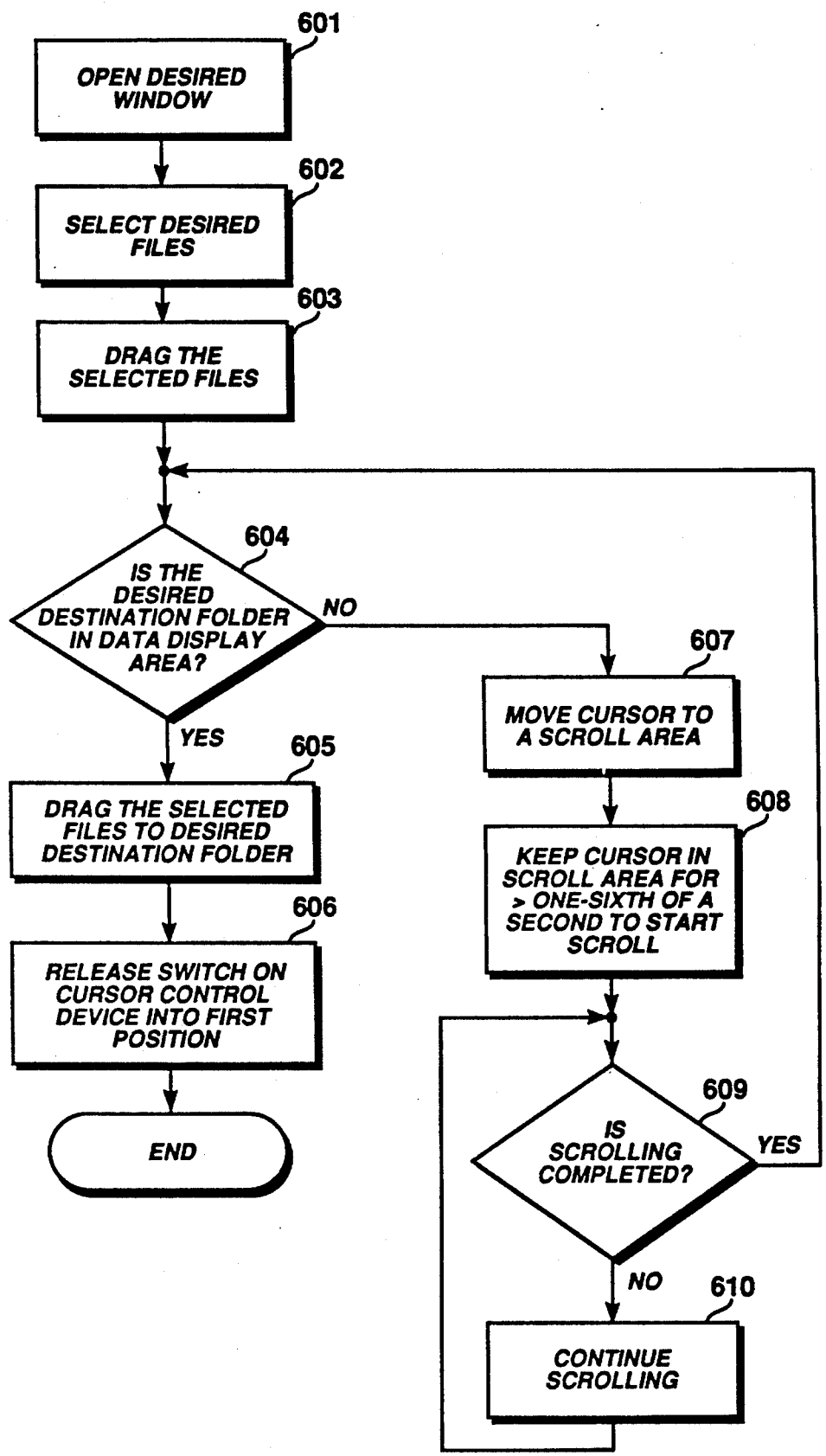
FIG. 6 is a flowchart outlining the steps a user would undertake to perform a specific task in utilizing the present invention.

To enable the scrolling of the preferred embodiment, a user would typically follow the steps outlined in FIG. 6. The first step 601 would be for the user to open the desired window. Opening of the window may be accomplished by "double clicking" on a folder in a currently displayed window or "double clicking" on an ICON representing a storage medium or folder. It should be noted that the users of the Macintosh Computer system are familiar with the terms "clicking", "double clicking" and opening windows. "Clicking" refers to depressing a button on the cursor control device and immediately releasing it. "Double clicking" refers to rapidly depressing/and releasing the button twice. This creates a signal to the computer system to perform a pre-defined task, in this case opening a folder or directory of a storage medium.

Next, the user would select the desired item, step 602 within the opened window. In the preferred embodiment, this would involve moving the cursor to the desired item and placing the switch associated with the cursor control device in a predetermined position (typically by depressing the button associated with the cursor control device). Alternatively, an item may be selected by "clicking" the button associated with the cursor control device when it is positioned on an item. Selection of an item may be verified to the user by displaying the selected item in a highlighted fashion, e.g. by reverse video manner or by simply darkening the icon. Display in a reverse video manner simply refers to inverting the display signals of the item verifying the selection of an item; displaying in a reverse video manner is well-know. This causes the item to be displayed with a dark background and a light foreground rather then a light background and dark foreground. Darkening the icon refers to displaying the item in a darker manner. The preferred embodiment allows also multiple items to be selected, by using a shift-click selection technique. Using the shift-click technique, the user depresses a shift key on the keyboard while "clicking" on the desired item. This will result in multiple items being highlighted. Another technique of selecting multiple items is allowed when the items are being displayed as ICONs. With this technique, a point on the display is chosen for the creation of a selection rectangle. A switch associated with the cursor control device will be placed in a second position and the cursor moved to a diagonal point of the selection rectangle. An outline of the selection rectangle will be created as the cursor is moved across the display. When the switch associated with the cursor control device is placed in the first position, the items within the selection rectangle will be "selected" and highlighted.

To deposit in the desired folder, the user would then drag the selected items to the desired folder, step 603. Dragging is accomplished by positioning the cursor on a selected item and placing the switch associated with the cursor control device in a second position. It should be noted that in some instances the switch associated with the cursor control device is already in the second position, typically when only one item is selected. While the switch is in the second position, the cursor can be moved and an outline of the selected item(s) will follow the cursor. Dragging of items in this manner is known in the art. The user must then determine if the desired destination folder is visible in the data display area 304 (illustrated in FIG. 3), step 604. If the desired folder is visible in the data display area 304, then the cursor is placed on that folder, step 605, and the switch associated with the cursor control device is placed into the first position, step 606. This results in the items being placed within that folder (i.e. moved to the desired directory), thus completing the tasks.

If the desired folder is not displayed in the data display area 304, scrolling of the window may be required to locate the desired folder. While the items are being dragged (and the switch is kept in the second position), scrolling is enabled by placing the cursor in one of the above described scroll areas of the visible display area 303 (illustrated in FIG. 3), step 607. Generally, the sequence of the items will follow some logical organization, e.g. by alphabetical order or by size. Thus, the direction of the scrolling can be determined in a logical manner. The cursor is placed in the scroll area for a predetermined period of time, step 608. In the preferred embodiment, the cursor is kept in the scroll area for a minimum of one-sixth of a second. It would be obvious to vary this amount of time without departing from the spirit and scope of the present invention. The user must then determine when scrolling is complete, step 609. As long as the desired destination folder is not in the data display area 304, the user would choose to continue scrolling, step 610 after which the user would then determine if scrolling is complete (i.e. repeat step 609). When the user moves the cursor out of the scroll area, scrolling is completed. The flow of user steps would then restart at step 604.

It should be noted that the completion of scrolling may be signaled by another event; the exhaustion of viewable data in the direction being scrolled. When this occurs, the user may invoke scrolling in the above described manner, in a different direction.

Figure 7A:
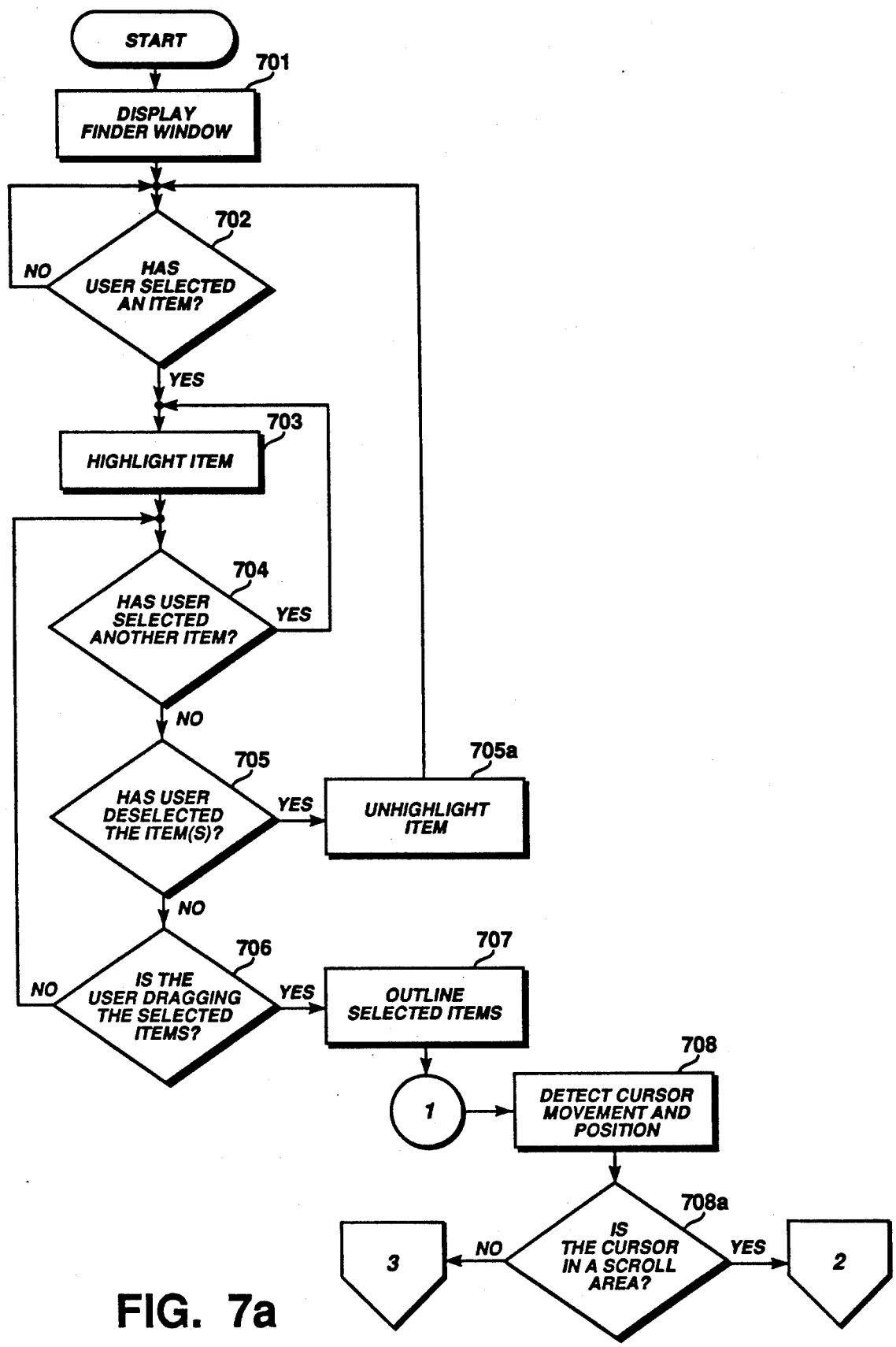
FIGS. 7a-7e are flowcharts outlining the process and steps a computer system would undertake in utilizing the present invention.

FIGS. 7a-7e outline the computer system operation with respect to the user steps of FIG. 6. Referring to FIG. 7a, the system responds to the user request for a window by displaying a window, step 701. The system then determines if the user has selected an item in the window, step 702. If the system detects that an item has been selected, the system highlights the item, step 703. The system then detects whether or not the user is selecting another item, step 704. This will occur in the preferred embodiment by a detection of the shift key signal while a selection is being made, step 704. If multiple items are being selected they will be highlighted per step 703. The system will then determine if the user has de-selected previously selected items. De-selection may occur if another item is selected without the depressing of the shift key. De-selection may also occur if the cursor is placed outside of the visible display area 303 and the switch associated with the cursor control device is set in the second position or "clicked". If de-selection occurs, the system will unhighlight the item, step 705a.

At this point, the system will detect whether the items are being dragged by monitoring cursor movement and the position of the switch associated with the cursor control device, step 706. As long as the user is not dragging the selected items, it will check to see if the user has selected another item, step 704. When the items are being dragged, (the cursor is positioned over a selected item while the switch is set to the second position and movement of the cursor is initiated) an outline of the selected item(s) is displayed, step 707. The outline follows the cursor as it moves across the display.

Figure 7B:
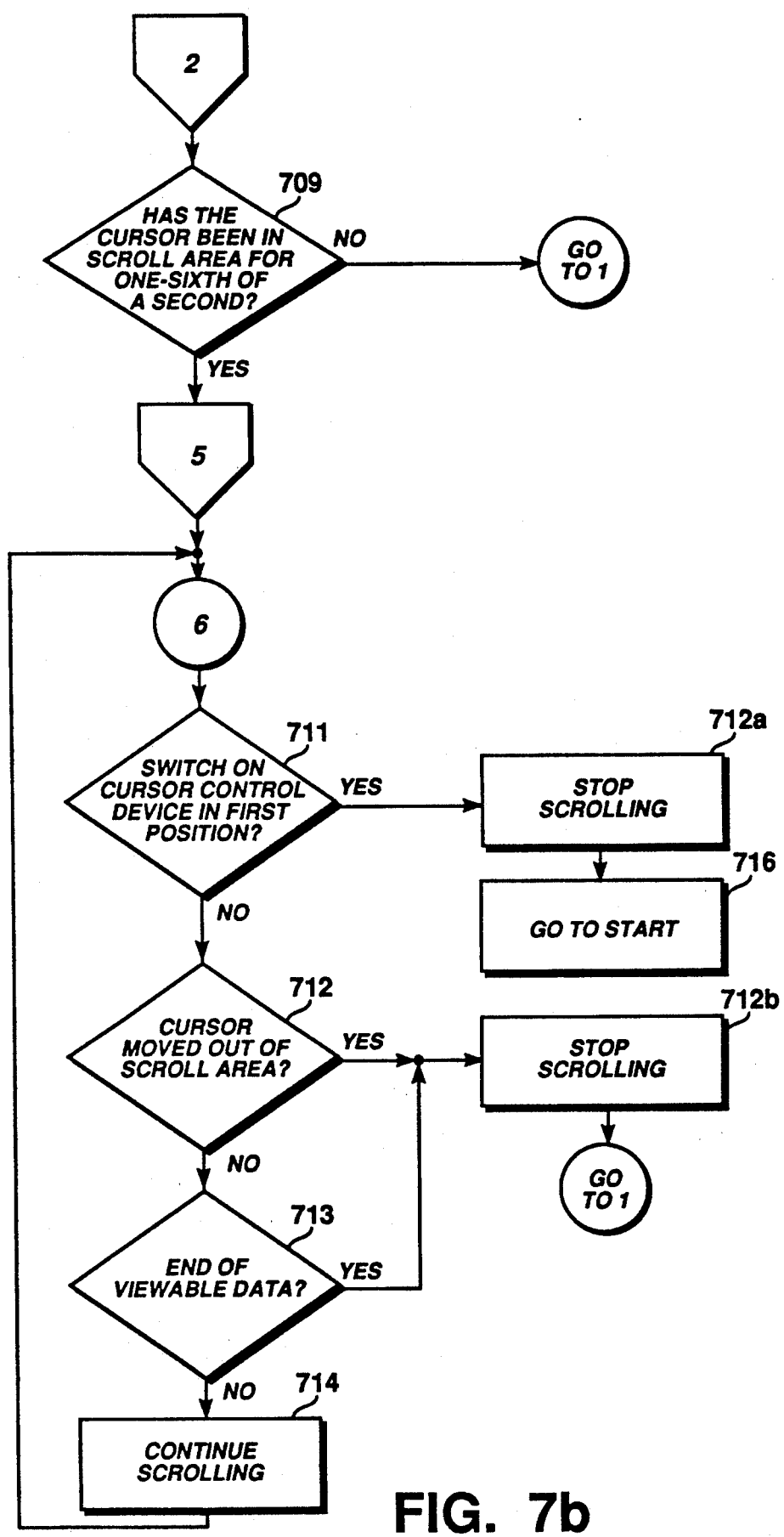

The system will then enter a state where it is detecting cursor movement and position, step 708. The system will first determine whether or not the cursor is in a scroll area, step 708a. In essence, it is trying to determine whether the user is attempting to scroll the data display area 304, or whether it is trying to move the selected items into another window. Referring to FIG. 7b, assuming that the cursor has been detected in a scroll area, the next step is to determine if the cursor has been in the scroll area for a predetermined period of time, step 709. As described above, in the preferred embodiment the predetermined period of is time one-sixth of a second. If the cursor was not in a scroll area for the predetermined period of time, the system returns to the state where it is detecting cursor movement and position, step 708. Otherwise, the system will detect which scroll area the cursor is in.

Figure 7C:
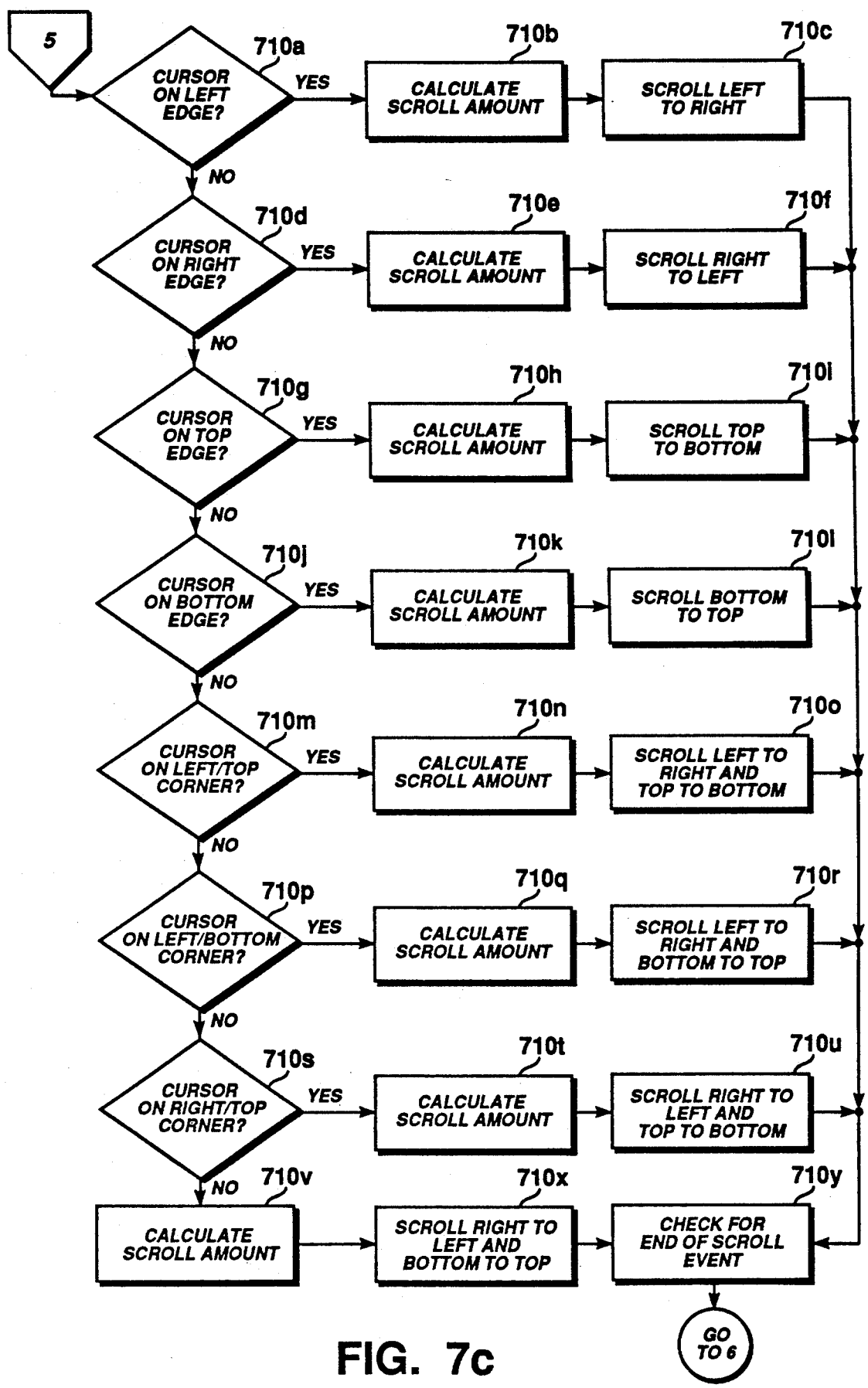

Referring to FIG. 7c, assuming the cursor is detected on the left edge (i.e. the left to right scroll area), step 710a, the system will then calculate the scroll amount, step 710b. The system calculates the scroll amount by determining the amount of data that needs to be displayed in order to bring the rectangular area surrounding the cursor completely into the visible display area (in the manner described above). As described above, the closer to an outside edge to a scroll area, the greater the amount of data that will need to be moved into the visible display area. Once this is done, the scrolling i.e. bringing the rectangular area into the visible display area occurs, step 710c. As described above, the steps 710b-710c are performed by a window control macro, which receives as input, information concerning the rectangle. It should be noted that as long as the cursor remains in the scroll area, or some other event has not caused termination of scrolling (described in more detail below), the aforementioned steps 710b and 710c are repeated.

The steps 710d-710x are repetitive of the steps taken as described above, for each of the scroll areas. It is notable that steps 710m, 710p, and 710s (step 710v assumes the cursor is in the right/left edge corner) detect the cursor at an intersection of two scroll areas, i.e. a corner. In these instances, the corresponding scroll amount calculations, steps 710n, 710q, 710t, and 710x, must determine vertical and horizontal scrolling amounts in order to bring the rectangular scroll area into the visible display area. Again, these determinations are made by a window control macro.

When the rectangular area is in the viewable display area, i.e. a scroll has occurred, the system will check if an event has occurred to terminate scrolling, step 710y. Referring back to FIG. 7b, the system will first detect the position of the switch associated with the cursor control device, step 711. If the switch has been placed in the first position, scrolling will stop, step 712a and the system will return to the start state, step 716. Assuming the switch is still in the second position, the position of the cursor is checked to determine if it was moved out of the scroll area, step 712. If the cursor is moved out of the scroll area, scrolling is stopped, step 712b. The system will then return to the state where it is detecting cursor movement and position, step 708. If the end of viewable data is reached in the direction of the scrolling, step 713, scrolling is stopped, step 712b. The system will then return to the state where it is detecting cursor movement and position, step 708.

If none of the aforementioned events occur, scrolling continues for another rectangular area, step 714 and the system will then again check for events that will stop scrolling.

Figure 7D:
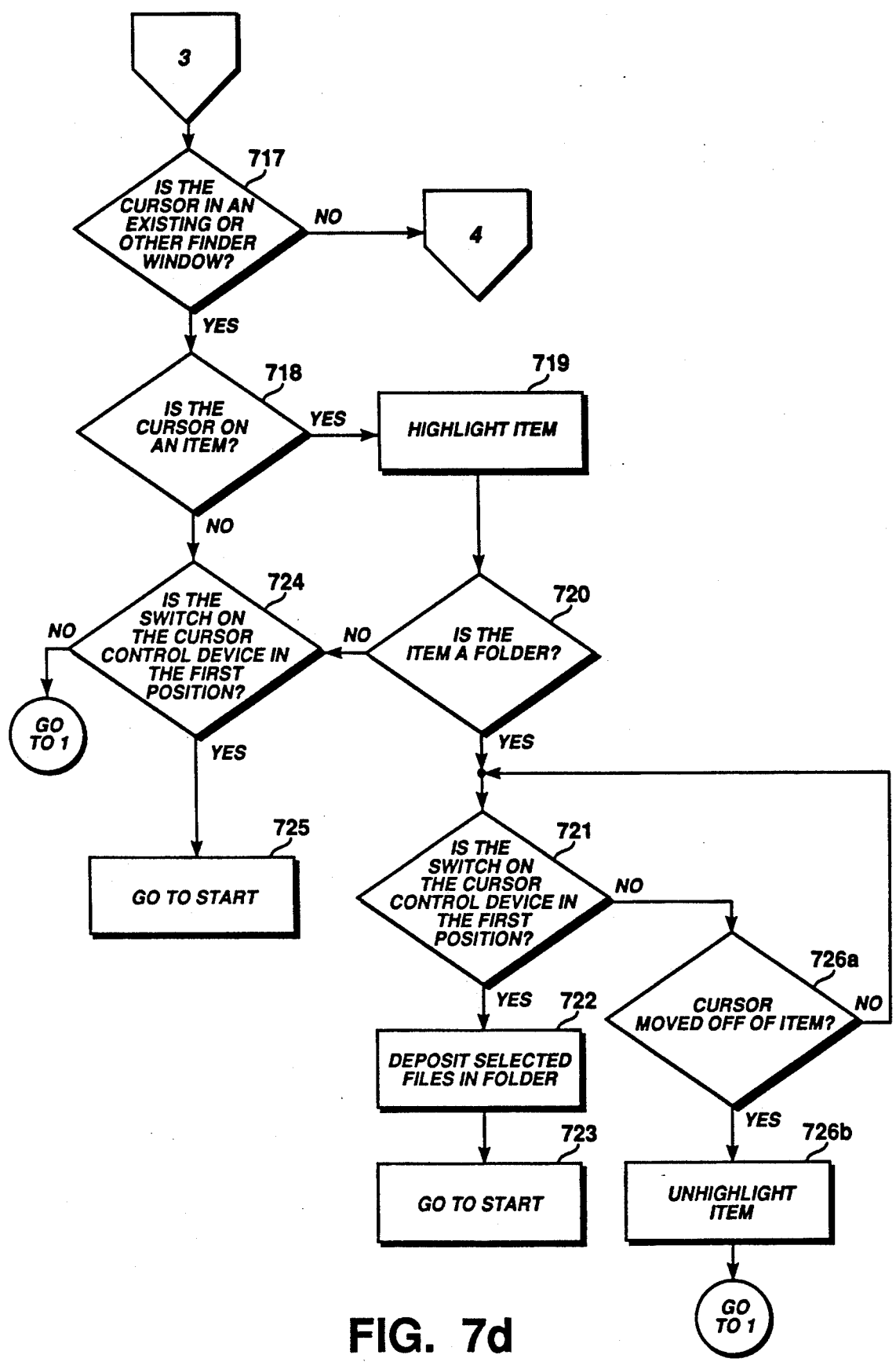

Referring to FIG. 7d, assuming that the cursor is not in a scroll area, the cursor may be in either the existing window or another Finder window. The processing that occurs if the cursor is in either an existing window or another Finder window, is the same. Assuming that the cursor is in either another Finder window or the same window, it must be determined where the cursor is pointing, step 717. First, it is determined whether or not the cursor is on an item, step 718. If the cursor is on an item, the system causes the item to be highlighted, step 719. Assuming it is on an item, it is then determined whether or not the item is a folder, step 720. If the item is a folder and the switch associated with the cursor control device is detected in the first position, step 721, the selected items are deposited in the folder, step 722, and the system goes back to its start state, step 723. If the switch associated with the cursor control device is in the second position, the system must detect if the cursor is still on the item, step 726a. If the cursor is off the item, the item is unhighlighted, step 726b, and the system returns to the state where it is detecting cursor movement and position, step 708. If the cursor is still on the item, it again checks the position of the switch associated with the cursor control device, step 721.

If the cursor is not on an item or if the item is not a folder, the system must again determine the position of the switch associated with the cursor, step 724. If the cursor switch is in the first position, the system reverts to its start state, step 725 and deposits the files in the window where they were last located. If the switch is still in the second position, the system returns to the state where it is detecting cursor movement and position, step 708.

Figure 7E:
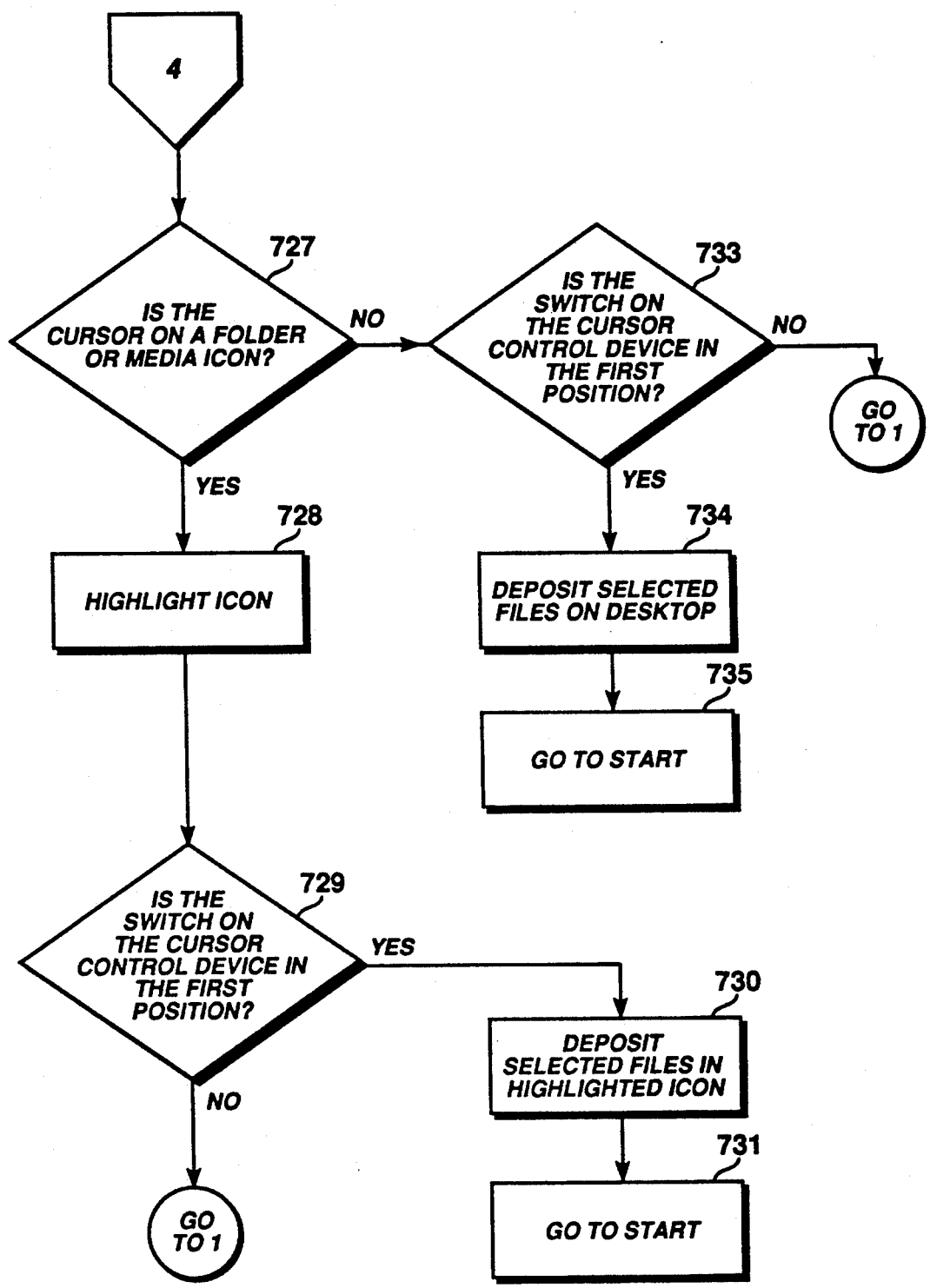

Referring now to FIG. 7e, and assuming that the cursor is not detected in a window, the system checks to see if the cursor may either be on an ICON representing a folder or some media, step 727. If the cursor is detected on an ICON, the ICON is highlighted, step 728. The system then looks to detect whether or not the switch associated with the cursor control device is in the first or second position, step 729. If the switch is in the first position, the selected files are deposited into the folder or storage medium represented by the ICON, step 730, and the system reverts back to its start state, step 731. If the switch is detected in the second position, the system returns to the state where it is detecting cursor movement and position, step 708.

If it is detected that the cursor is not on a folder or a media ICON, it is assumed that the cursor is on the Finder "desktop". In the preferred embodiment, the Finder "desktop" refers to a base display area which spans the physical display and is the base of operations for organizing applications, folders, and other items. Users of the Macintosh Computer System will be familiar with the Finder "desktop". The position of the switch associated with the cursor control device is then checked, step 733. If the switch associated with the cursor control device is in the first position, the system deposits the selected items on the Finder "desktop", step 734, and the system reverts to its start state, step 735. If the switch associated with the cursor control device is in the second position, the system returns to the state where it is detecting cursor movement and position, step 708.

Thus, a method and apparatus intelligent scrolling has been described. By defining predetermined scroll areas within the boundaries of a window display, and utilizing processor means by which the processor determines the context the user is in, the position of the cursor within the display, and the time the cursor has been in the designated position, scrolling can be enabled while maintaining the selection of items within the window being scrolled.

We claim:

1. In a computer controlled display system having a display wherein a plurality of regions may be displayed including at least a first region, said first region having at least a first item within a visible display area of said first region and said first region having at least one item, including a second item, which is not within the visible display area of said first region, a method for scrolling the contents of said first region to display said second item comprising:

selecting at least said first item within said first region by positioning a cursor over said first item and by placing a switch means in a predetermined position so that said first item is associated with said cursor for further operation or manipulation;

positioning said cursor over a predetermined scrolling area;

determining that a predetermined period of time has elapsed while the cursor has been positioned in said predetermined scrolling area; and scrolling the contents of said first region in a direction corresponding to said predetermined scrolling area to display said second item while said first item remains selected and associated with said cursor.

2. A method as in claim 1 wherein said step of positioning said cursor over said predetermined scrolling area occurs while said switch means is kept in said predetermined position.

3. A method as in claim 2 wherein said first region comprises a window and wherein a second region comprises a desktop which cannot be scrolled.

4. A method as in claim 3 wherein said switch means is located on a cursor control device which positions said cursor on said display and said first region contains at least four predetermined scrolling areas comprising a scrolling area located near the tip edge of said first region, a scrolling area near the bottom edge of said first region, a scrolling area near the left edge of said first region, and a scrolling area near the right edge of said first region.

5. The method recited in claim 1 wherein said step of scrolling the contents of said first region further includes scrolling said first region at a rate corresponding to the position of said cursor in said predetermined scrolling area.

6. The method as recited in claim 5 wherein said scrolling direction is a diagonal direction.

7. The method as recited in claim 1 is further comprised of the steps of:
   positioning said cursor over a second predetermined scrolling area; and
   scrolling the contents of said first region in a direction corresponding to said second predetermined scrolling area.

8. A method as in claim 1 wherein said step of determining that a predetermining period of time has elapsed also determines whether scrolling is in a first and or a second context and wherein said predetermined scrolling area causes scrolling in a first direction in said first context and causes scrolling in a second direction in said second context.

9. A method as in claim 8 wherein said first direction is perpendicular to said second direction.

10. In a computer controlled display system having a display wherein a plurality of windows may be displayed, each of said plurality of windows being capable of displaying a plurality of items, said computer controlled display system allowing at least one selected item from a first window of said plurality of windows to be moved to a second of said plurality of windows, a method for scrolling a visible display area of said first window comprising the steps of:
   positioning a cursor on a first item in said first window by manipulation of a cursor control device;
   selecting said first item so that said first item is associated with said cursor for further operation or manipulation;
   positioning said cursor in one of a plurality of predetermined scrolling areas associated with said first window;
   determining that a predetermined period of time has elapsed while the cursor has been positioned in said predetermined scrolling area and while said first item remains selected; and
   scrolling said visible display area in a corresponding direction of said predetermined scrolling area, said corresponding direction determined by the location of said predetermined scrolling area relative to said first window while said first item remains associated with said cursor.

11. A method as in claim 10 wherein said step of selecting said item is further comprised of placing a switch means associated with said cursor control device in a predetermined position.

12. A method as in claim 11 further comprising the steps of:
   determining said switch associated with said cursor control device is not in said predetermined position; and
   terminate scrolling of said visible display area.

13. A method as in claim 12 further comprising the steps of:
   determining that the cursor is no longer positioned in said predetermined scrolling area; and
   terminate scrolling of said visible display area.

14. A method as in claim 13 wherein said predetermined period of time has elapsed while the cursor has been positioned in said predetermined scrolling area is one-sixth of a second.

15. A method as in claim 14 wherein a rate of scrolling is dependant on cursor position with respect to an outside edge of said predetermined scrolling areas, so that when said cursor is positioned closer to an outside edge of said predetermined scrolling areas, said scrolling rate is increased.

16. A method as in claim 15 wherein said cursor may be simultaneously positioned in more than one of said predetermined scrolling areas, so that scrolling is in two directions.

17. A method as in claim 10 wherein said first item is selected by positioning said cursor over said first item and by placing a switch means in a predetermined position and wherein the step of positioning said cursor in one of a plurality of predetermined scrolling areas occurs by moving a representation of said first item, while keeping said switch means in a predetermined position, over to said one of a plurality of predetermined scrolling areas.

18. In a computer controlled display system having a display wherein a plurality of regions may be displayed including at least a first region, said first region having at least one item, including a first item, within a visible display area of said first region and said first region having at least one item, including a second item, which is not within the visible display area, said second item being a directory, a method for scrolling the contents of said first region to display said second item and depositing at least said first item into said second item, comprising:
   selecting at least said first item within said first region by positioning a cursor over said first item and by placing a switch means in a first predetermined position;
   positioning said cursor over a predetermined scrolling area located within said first region;
   determining that a predetermined period of time has elapsed while the cursor has been positioned in said predetermined scrolling area;
   scrolling the contents of said first region in a direction corresponding to said predetermined scrolling area to display said second item while said first item remains selected, said direction determined by the location of said predetermined scrolling area relative to said first region; and
   depositing at least said first item into said second item by positioning the cursor over said second item and by placing said switch in a second predetermined position.

19. In a computer controlled display system having a display wherein a plurality of regions may be displayed including at least a first region, said first region having at least a first item within a visible display area of said first region and said first region having at least one item, including a second item, which is not within the visible display area of said first region, a method for scrolling the contents of said first region to display said second item comprising:

selecting at least said first item within said first region by positioning a cursor over said first item so that said first item is associated with said cursor for further operation or manipulation;

positioning said cursor over a predetermined scrolling area and dragging an image of said first item displayed adjacent said cursor;

determining that a predetermined period of time has elapsed while the cursor has been positioned in said predetermined scrolling area; and scrolling the contents of said first region in a direction corresponding to said predetermined scrolling area to display said second item while said first item remains selected and its image remains displayed adjacent said cursor.

* * * * *